UNITED STATES PATENT OFFICE.

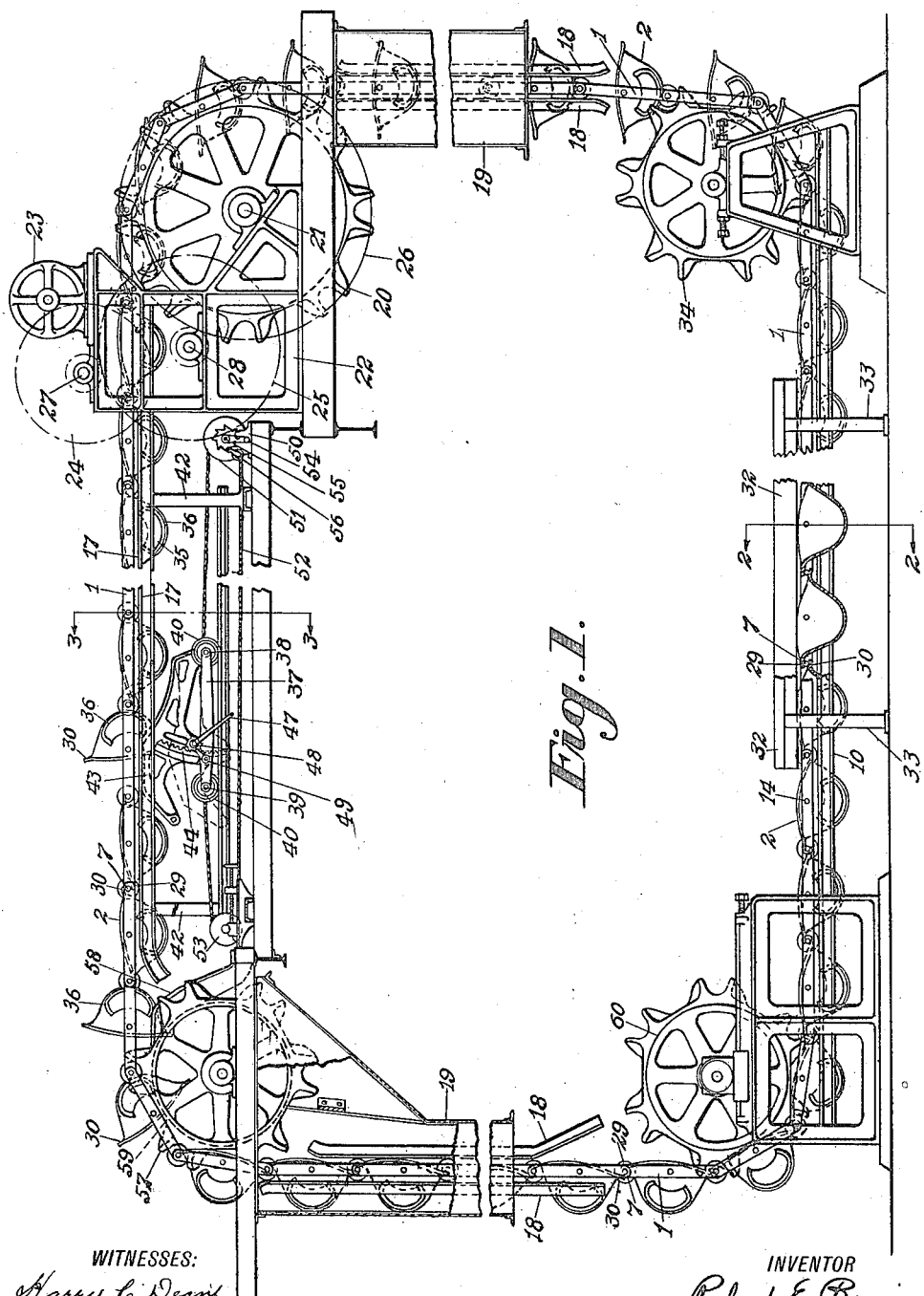

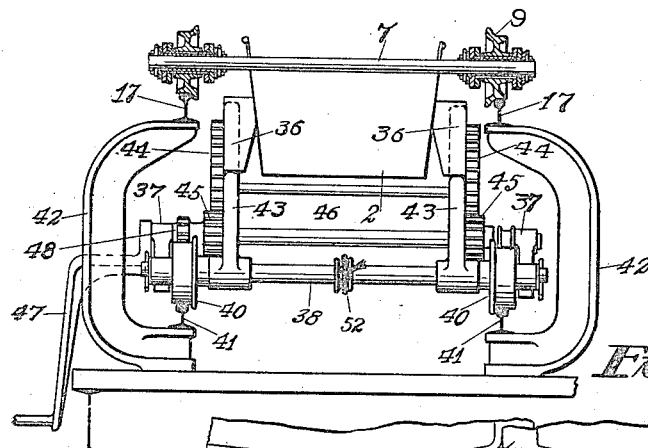
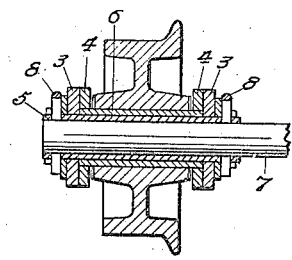
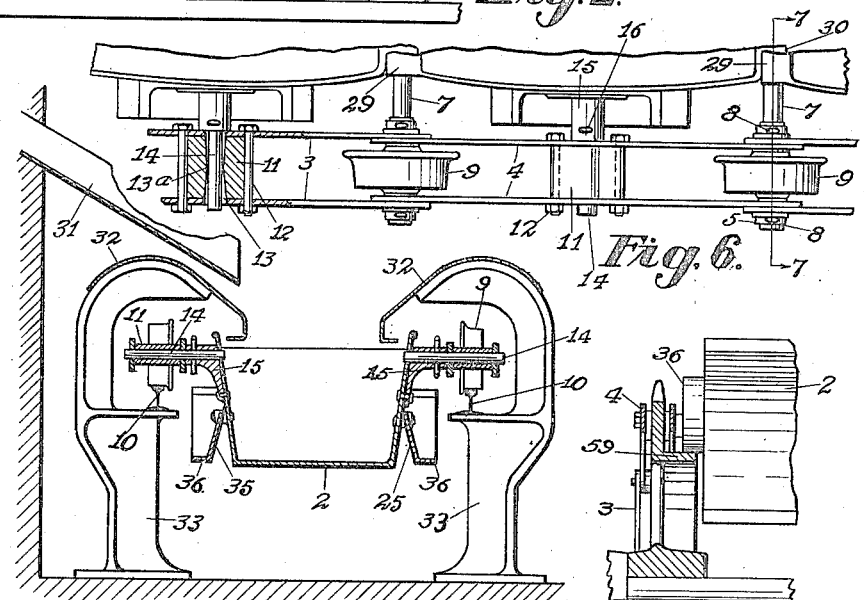
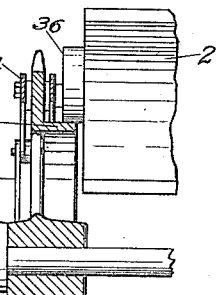
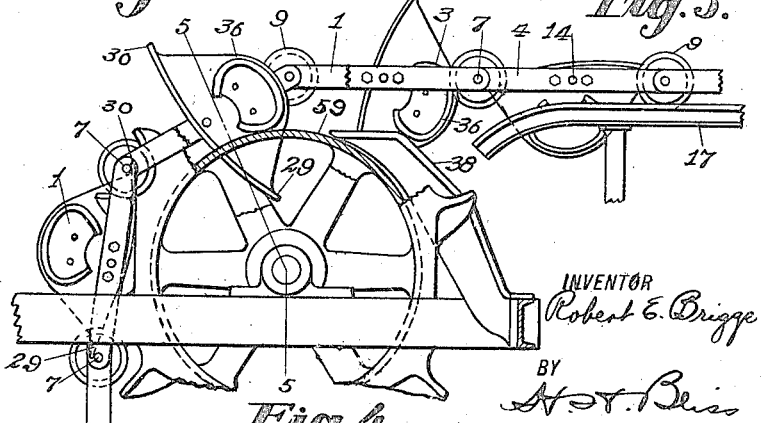

ROBERT E. BRIGGS, OF COLUMBUS, OHIO, ASSIGNOR TO THE JEFFREY MANUFACTURING COMPANY, OF COLUMBUS, OHIO, A CORPORATION OF OHIO.

CONVEYER.

1,247,365.

Specification of Letters Patent.

Patented Nov. 20, 1917.

Application filed November 21, 1916. Serial No. 132,707.

*To all whom it may concern:*

Be it known that I, ROBERT E. BRIGGS, a citizen of the United States, residing at Columbus, in the county of Franklin and the State of Ohio, have invented certain new and useful Improvements in Conveyers, of which the following is a specification, reference being had therein to the accompanying drawing.

The present invention relates to certain new and useful improvements in conveyers, and particularly to that class of conveyers wherein a series of buckets are pivotally supported by a pair of parallel endless chains, such as are commonly known in the art as pivoted bucket conveyers. The advantage of conveyers of this kind, which have great carrying capacity, are well recognized. It is a common practice to load the buckets or carriers on the lower horizontal run of the conveyer, then elevate them and finally cause them to discharge while moving along the upper substantially horizontal run, and many inventions have been made and suggested for enabling the loading of a conveyer thus constructed and arranged while in continuous motion. One expedient adopted is to provide the adjacent edges of the buckets with lips or projecting flanges adapted to overhang the edges of the next adjacent bucket or buckets in order to close the open spaces that would otherwise exist between the buckets and through which the material from a constantly delivering spout would pass were not some provision such as that referred to made to close these open spaces. Great difficulty has, heretofore, however, been experienced in operating conveyers of this character, owing to the fact that the overhanging lips of the buckets tend to cause the buckets to interfere with each other as they pass from one run to another in the course of the circuit of the conveyer; and to prevent this interference complicated devices have been suggested and devised to tilt the buckets at various points in the course of their travel, none of which devices up to this time, have operated with the unfailing reliability which is essential to the successful use of such conveyers.

It is the especial object of this invention to provide in a conveyer of the class described, improved means for passing the buckets from the upper to the lower horizontal run of the conveyer without interference of the overlapping lips of adjacent buckets.

Devices embodying my invention are set forth in the following specification, reference being had to the accompanying drawings, but it is to be remembered that modification may be made in the details of these devices without departing from the spirit of the invention.

Of the drawings

Figure 1 is a general elevational view of a conveyer embodying my invention.

Fig. 2 is a cross sectional view of the upper run of the conveyer taken along the line 2—2 of Fig. 1.

Fig. 3 is a cross sectional view of the lower run of the conveyer taken along the line 3—3 of Fig. 1.

Fig. 4 is an enlarged detail of the devices for passing the buckets from the upper horizontal to the descending vertical run of the conveyer.

Fig. 5 is a fragmentary section along the line 5—5 of Fig. 4.

Fig. 6 is a fragmentary plan view showing in detail the conveyer chain and the method of attaching the buckets thereto.

Fig. 7 is a fragmentary sectional view taken along the line 7—7 of Fig. 6.

Like numerals refer to similar parts in the several figures.

The conveyer comprises a pair of endless chains 1, between which are pivotally supported the swinging buckets 2. These chains consist of pairs of steel side bars 3 and 4, the bars of each pair being joined together near each end in spaced parallelism, by tubular steel thimbles 5 and 6 respectively. These pairs of bars are arranged alternately, end to end, the ends of the bars 3 overlapping the ends of the bars 4 and the thimbles 5 extending through the thimbles 6 to form the articulation of the chain. The side bars of each pair are so joined to their respective thimbles that there may be no rotary motion between them, the relative rotation of articulation between pairs being confined to the thimbles 4 and 5 thus distributing the wear over the large bearing surfaces of the thimbles and greatly increasing the life of the chain. Extending through the thimbles 5 are rods 7 which extend across the conveyer to join the chains in spaced parallelism. Suitable cotter pins 8 extending through the thimbles 5 and the rods 7 hold the members in proper working relation. Journaled upon the thimbles 6 between the side bars 4 are flanged traction rollers 9 adapted to travel along the guide rails 10 suitably arranged along the course of the conveyer. Between each pair of side bars 3 and 4, midway between the rollers 9 are positioned bearing blocks 11 securely clamped in place by the bolts 12. These bearing blocks 11 together with the adjacent side bars are pierced by apertures 13 in which are journaled the trunnion pins 14 to support the buckets 2. To each end of each bucket 2 is riveted a trunnion casting 15 having an aperture in which the trunnion pin 14 is mounted.

Cotter pins 16 extend through the casting 15 and the trunnion pin 14 to hold the latter in place. As it is practically impossible to maintain the two chains of the conveyer in perfect alinement at all parts of the circuit of the conveyer, it is necessary to provide a measure of flexibility in the pivotal mounting of the buckets. This is secured by making the diameter of the aperture 13 larger at each end than in the middle, thus forming a point bearing $13^a$ at the center of the bearing blocks upon which the trunnion pin 14 may rock.

The track 10 along the lower, and 17 along the upper horizontal runs support the chains, the buckets and the loads which the latter may carry, while the tracks 18 adjacent the vertical runs of the conveyer are for the purpose of guiding and preventing lateral swaying of the conveyer, for which purpose they may be arranged in pairs, one at each side of the path of the rollers 9. When the vertical runs of the conveyer pass through places where there is possible danger of the injury of persons by contact with the moving chains or buckets, or from material falling from the buckets, casings 19 are provided which completely inclose these parts.

At the places where the conveyer changes its direction, suitable guiding and supporting means are employed. I prefer for this purpose to use sprocket wheels with which the chains of the conveyer are adapted to engage. To one set of such sprocket wheels, preferably at 20 where the conveyer changes from the upward moving to the upper horizontal run; a motor may be connected to drive the conveyer. The two sprocket wheels 20, one for each chain of the conveyer, are mounted upon a shaft 21, supported by a suitable framework 22 which also carries the motor 23 and the connecting gearing, indicated by the broken circular lines 24, 25, 26, with their supporting shafts 27 and 28.

The buckets are provided, preferably at each edge with outwardly extending lips or flanges 29 and 30, arranged to overlap and thus bridge or close the spaces between adjacent buckets when the conveyer is moving horizontally. The conveyer is arranged to be loaded on the lower horizontal run where one or more feed spouts 31 are arranged. Through these material that is delivered to the conveyer buckets may flow continuously or so long as the conveyer is in operation, this being rendered feasible by reason of the overlapping edges of the buckets. Adjacent to where the feeding takes place, I prefer to arrange inclined stationary shields, or guard plates 32, arranged to overlie the side walls or ends of the buckets and thus direct the material to the latter, and at the same time prevent spilling, thus protecting the articulation of the chains from the injurious effects of the material which might otherwise fall upon them. While the rails 10 and the shield 32 may may be supported in any suitable manner, I preferably provide supporting brackets 33 which are adapted to be attached to any convenient foundation and which are so shaped and proportioned as to insure the proper relation of the parts of the conveyer.

It will be seen by reference to Fig. 1 that the rear lip 29 of each bucket overlies the adjacent cross bar 7 of the conveyer chains so that when the buckets come to the turning wheels 34, where the change from the lower horizontal to the upward moving vertical run takes place, the buckets separate easily and without interference. When they reach the turning wheels 20 and the change is made from the upward moving vertical to the upper horizontal run, the buckets naturally come into proper relations, the rear lip 30 of the forward bucket overlying the cross bars and the front lip 29 of its neighbor to the rear, this position being desirable in order to permit the easy tipping of the buckets without interfering one with another.

In the arrangement illustrated in Fig. 1 provision is made for the discharge of material from the buckets as they travel along the upper horizontal run. Attached to the ends of the buckets 2 are tripper cams 35 having flanges 36 adapted to engage with the automatic tripper, or bucket tipping device, by which the buckets are tipped to allow the material to spill therefrom. This automatic tripper comprises a carriage having side frames 37 and axles 38 and 39 upon which are mounted the flanged traction rollers 40. Positioned below the rails 17, of the upper horizontal run, are other rails 41 along which the rollers 40 are adapted to travel. The rails 17 and 41 may be supported in any suitable manner, but I prefer to supply supporting brackets 42 adapted to be attached to any convenient foundation and so shaped and proportioned as to insure the correct relation of the parts. Pivoted upon the axle 39, for rotation in vertical planes, are the tripper cams 43 which are adapted, when in one position, to engage the flanges 36 of the buckets to tip them to spill the material therefrom, and when in another position to allow the buckets to freely pass. Formed on the tripper cams 43, concentric with the axle 39, are arcuate racks 44 which are engaged by spur pinions 45 attached to a cross shaft 46 journaled in bearings of the side frames 37. A hand crank 47 is provided by which the shaft 46 may be rotated to cause the rotation of the tripper cams 42 into either their upper operative or their lower idle positions. A ratchet 48 and pawl 49 serve to hold the cams 43 in the desired position. Positioned at one end of the upper horizontal runway of the conveyer is a bracket 50 on which is journaled a winding drum 51 adapted to wind a rope 52 one end of which is attached to the axle 38 of the tripper carriage, and the other end, after being carried around the idler pulley 53 at the opposite end of the runway of the conveyer, is attached to the axle 39 of the tripper carriage. A crank 54 is provided to rotate the drum 51 thereby affording means to move the tripper carriage in either direction along the rails 41. A ratchet 55 and pawl 56 serves to prevent the travel of the tripper with the buckets during the operation of the conveyer. By this mechanism the buckets may be tipped at any desired point along the line of the upper runway. After discharging material in one position, if it is desired to move the tripper to another position, the tripper cam 43 will be lowered to its idle position, and the drum 51 rotated to move the carriage to the new position, after which the tripper cam 43 may again be raised to its operative position and the discharge of material be resumed.

The passage of the buckets from the upper horizontal run to the lower horizontal run presents some difficulties and my invention relates to means for accomplishing this change without the buckets unduly interfering with each other. On reaching the wheel 57 the buckets tend to maintain their horizontal position, but as the rearward lip 30 of each bucket overlies the cross rod 7 in its rear, and the forward lip 29 underlies the cross rod 7 in front, the buckets are not free to follow this tendency as they make the turn. If left to themselves the buckets take a position approaching tangency to the curve of the wheel 57 and pass into the descending vertical run of the conveyer in an edgewise position. On reaching the lower horizontal run, these buckets would be bottom upward, and if turned at this point the forward lips 29 would overlie the cross rods 7 in front and would not be in a suitable position to turn into the ascending vertical run at the wheel 34. To overcome this difficulty I place adjacent the wheels 57, stationary tripper cams 58 adapted to engage the flanges 36 of the buckets as they approach the wheels 57 and turn the said buckets into positions transverse of the chains 1. Attached to the inner sides of each of the wheels 57 are circular flanges 59 arranged to form a continuation of the tripper cams 58. These flanges 59 engage the flanges 36 of the buckets as they pass off the tripper cams 58 and maintain the transverse relation of the buckets until they reach a point where their centers of gravity pass outside the line of the chains 1. The buckets then rotate by gravity bringing their forward lips 29 into engagement with the cross rods 7 and pass thus in an edgewise position, down the descending vertical run coming around the wheel 60 into the lower horizontal run in proper position to be reloaded and to pass again to the ascending vertical run.

What I claim is—

1. In a conveyer of the class described, the combination of parallel endless chains, buckets having overlapping edges pivotally supported by the chains, wheels engaging the chains to change their direction of travel, and cylinders revolving with the wheels to guide the buckets as they change direction.

2. In a conveyer of the class described, the combination of parallel endless chains, buckets having overlapping edges pivotally supported by the chains, wheels engaging the chains to change their direction of travel, means to tilt the buckets as they approach the descending run, and cylinders revolving with the wheels to guide the buckets as they change direction.

3. In a conveyer of the class described, the combination of parallel endless chains, buckets having overlapping edges pivotally supported by the chains, wheels engaging the chains to change their direction of travel, means to tilt the buckets as they approach the descending run, and cylinders revolving with the wheels to engage the buckets and hold them in tilted position as they enter the descending run.

4. In a conveyer of the class described, the combination of parallel endless chains, buckets having overlapping edges pivotally supported by the chains, wheels engaging the chains to change their direction of travel, means to tilt the buckets as they approach the descending run, and cylindrical flanges on the wheels to engage the buckets and hold them in tilted position as they enter the descending run.

5. In a conveyer of the class described, the combination of parallel endless chains, buckets having overlapping edges pivotally supported by the chains, wheels engaging the chains to change their direction of travel, and cylindrical flanges on the wheels to guide the buckets as they change direction.

6. In a conveyer of the class described, the combination of parallel endless chains, buckets having overlapping edges pivotally supported by the chains, wheels engaging the chains to change their direction of travel, means to tilt the buckets as they approach the descending run and means revolving with the wheels to hold the buckets in tilted position as they enter the descending run.

In testimony whereof I affix my signature in the presence of two witnesses.

ROBERT E. BRIGGS.

Witnesses:
HARRY C. DEAN,
DUDLEY T. FISHER.

Copies of this patent may be obtained for five cents each, by addressing the "Commissioner of Patents, Washington, D. C."